F. W. COTTON, DEC'D.
W. L. WILLIAMS, EXECUTOR.
HEEL MACHINE.
APPLICATION FILED JULY 28, 1913. RENEWED MAY 20, 1915.
1,173,098.
Patented Feb. 22, 1916.
8 SHEETS—SHEET 6.
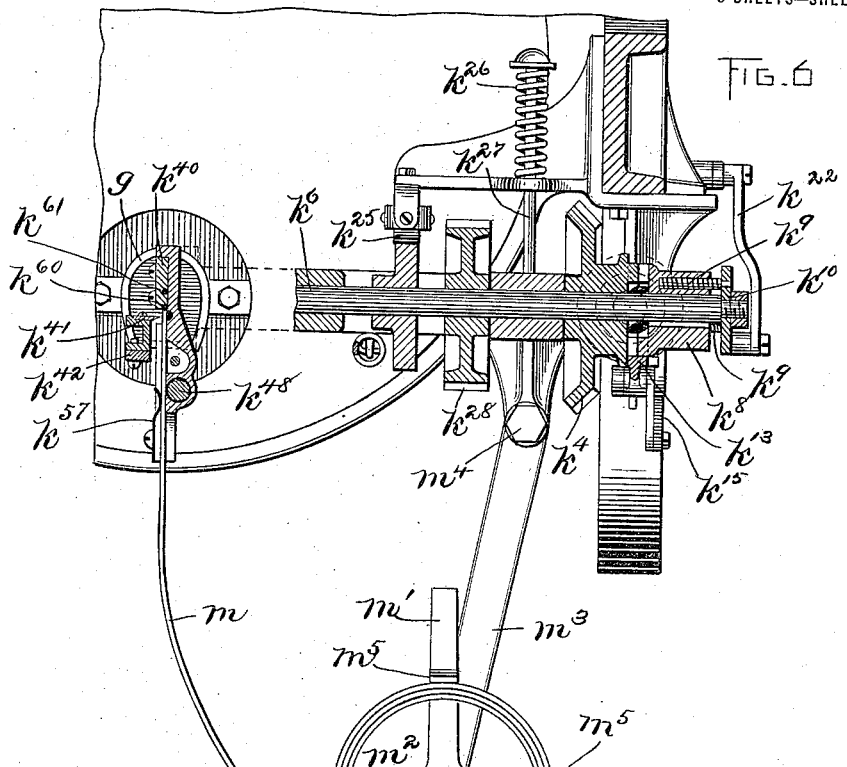
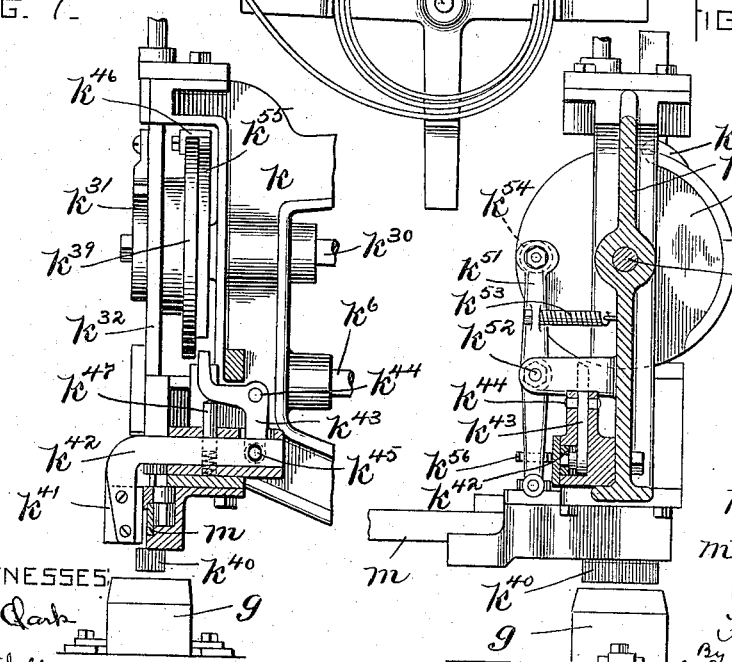
WITNESSES:
D. L. Clark
E. Batchelder
INVENTOR:
F. W. Cotton F. W. COTTON, DEC'D.
W. L. WILLIAMS, EXECUTOR.
HEEL MACHINE.
APPLICATION FILED JULY 28, 1913. RENEWED MAY 20, 1915.
Patented Feb. 22, 1916.
8 SHEETS—SHEET 7.
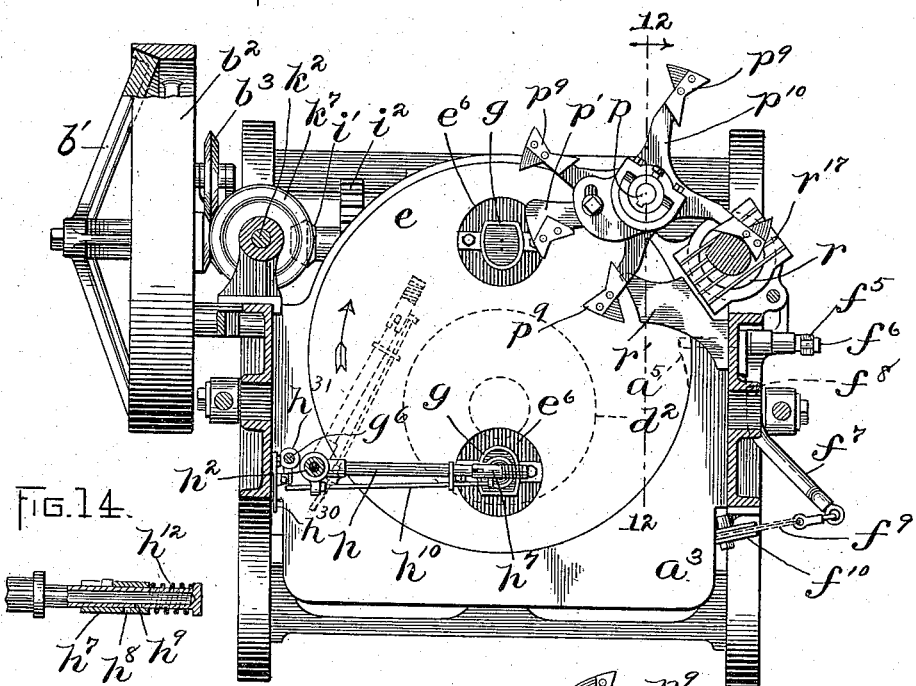
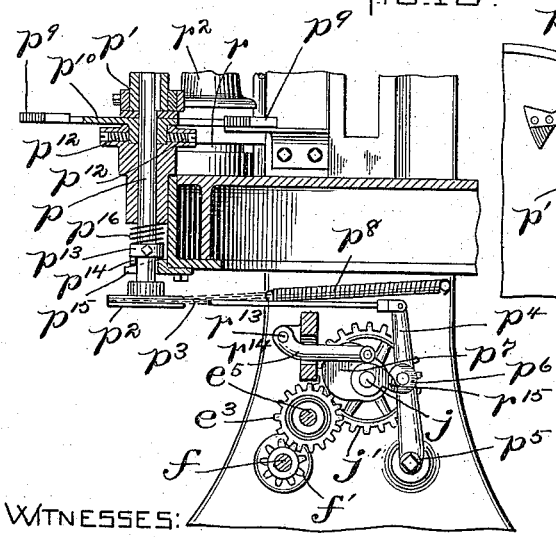

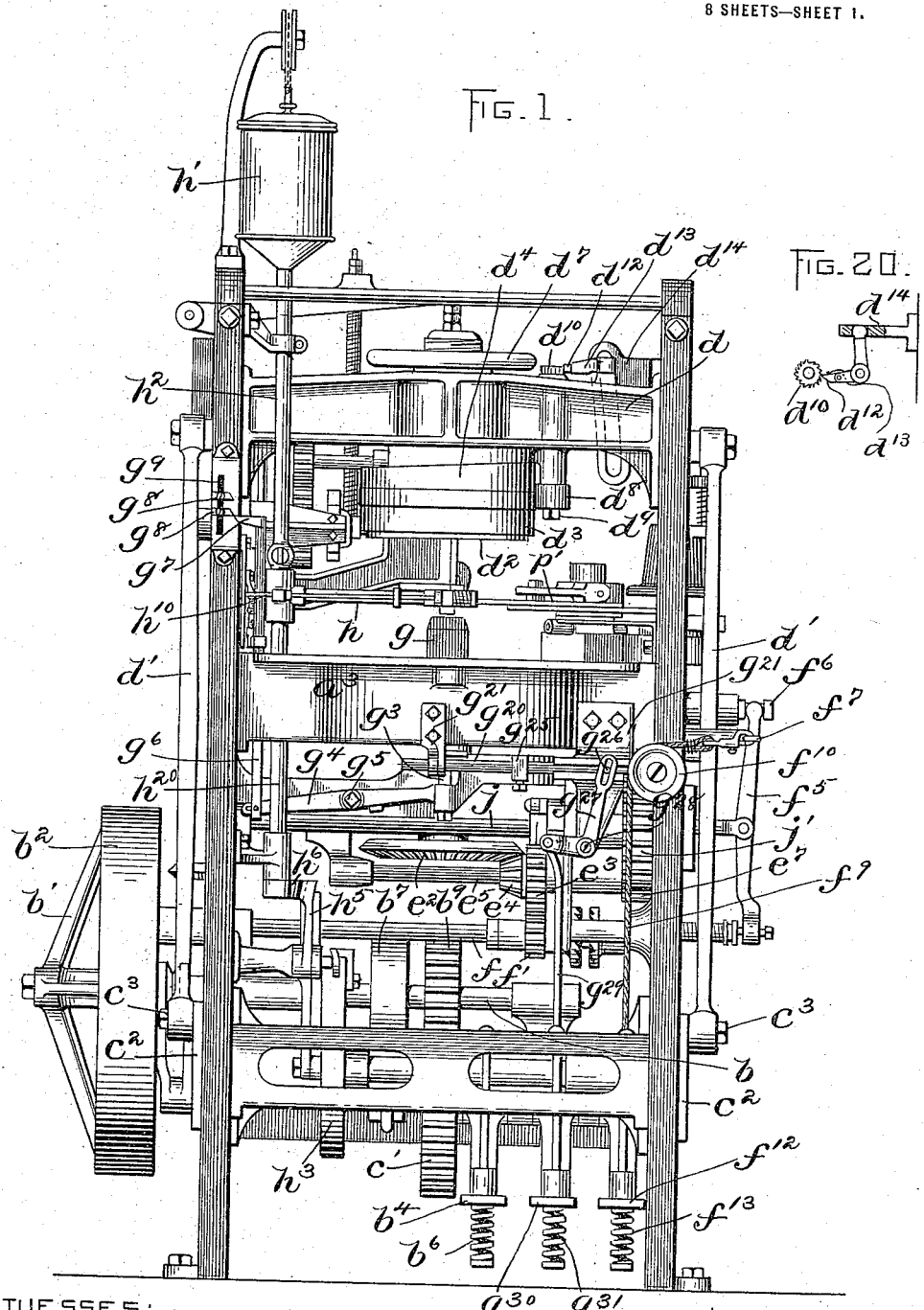

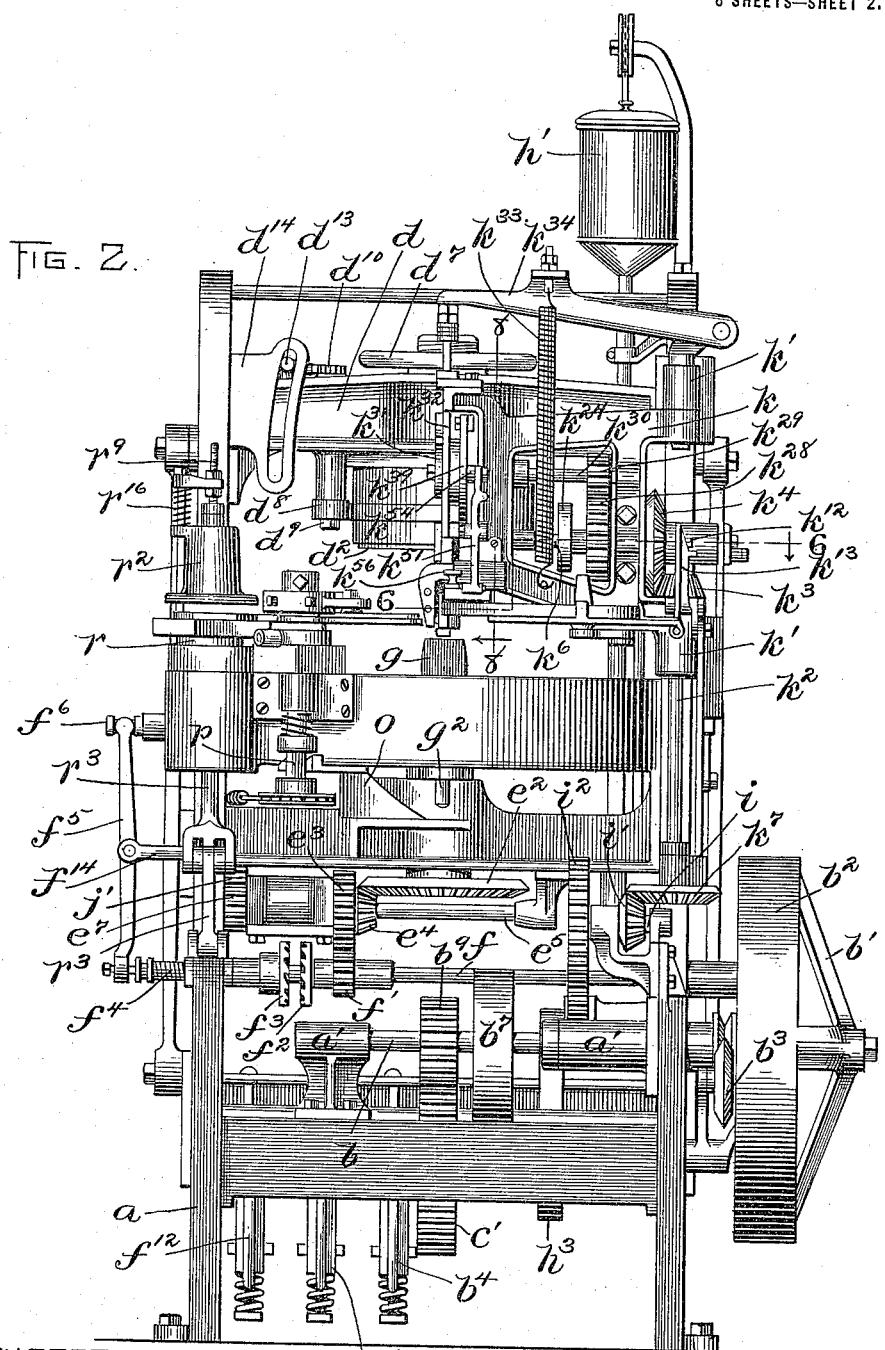

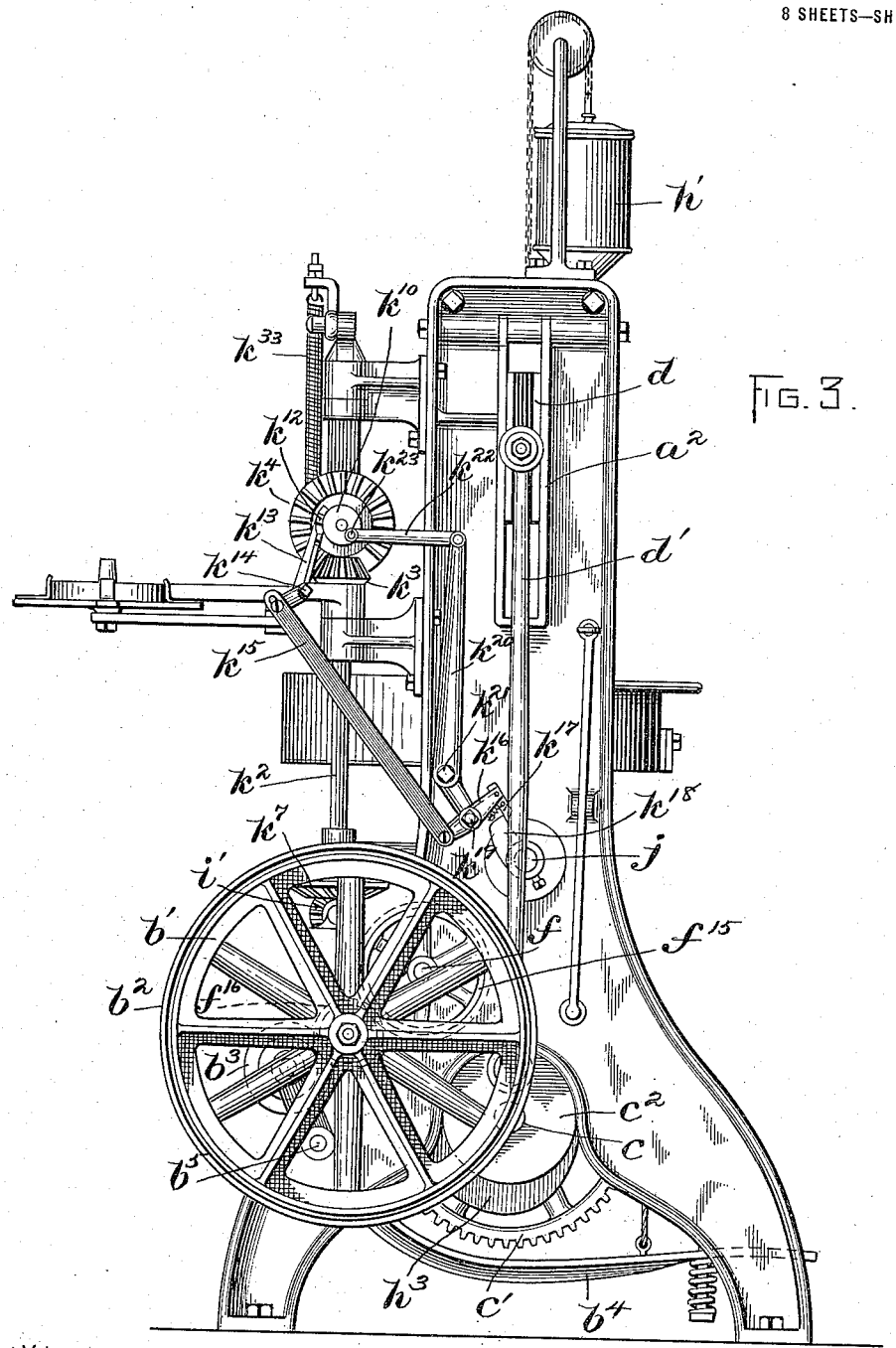

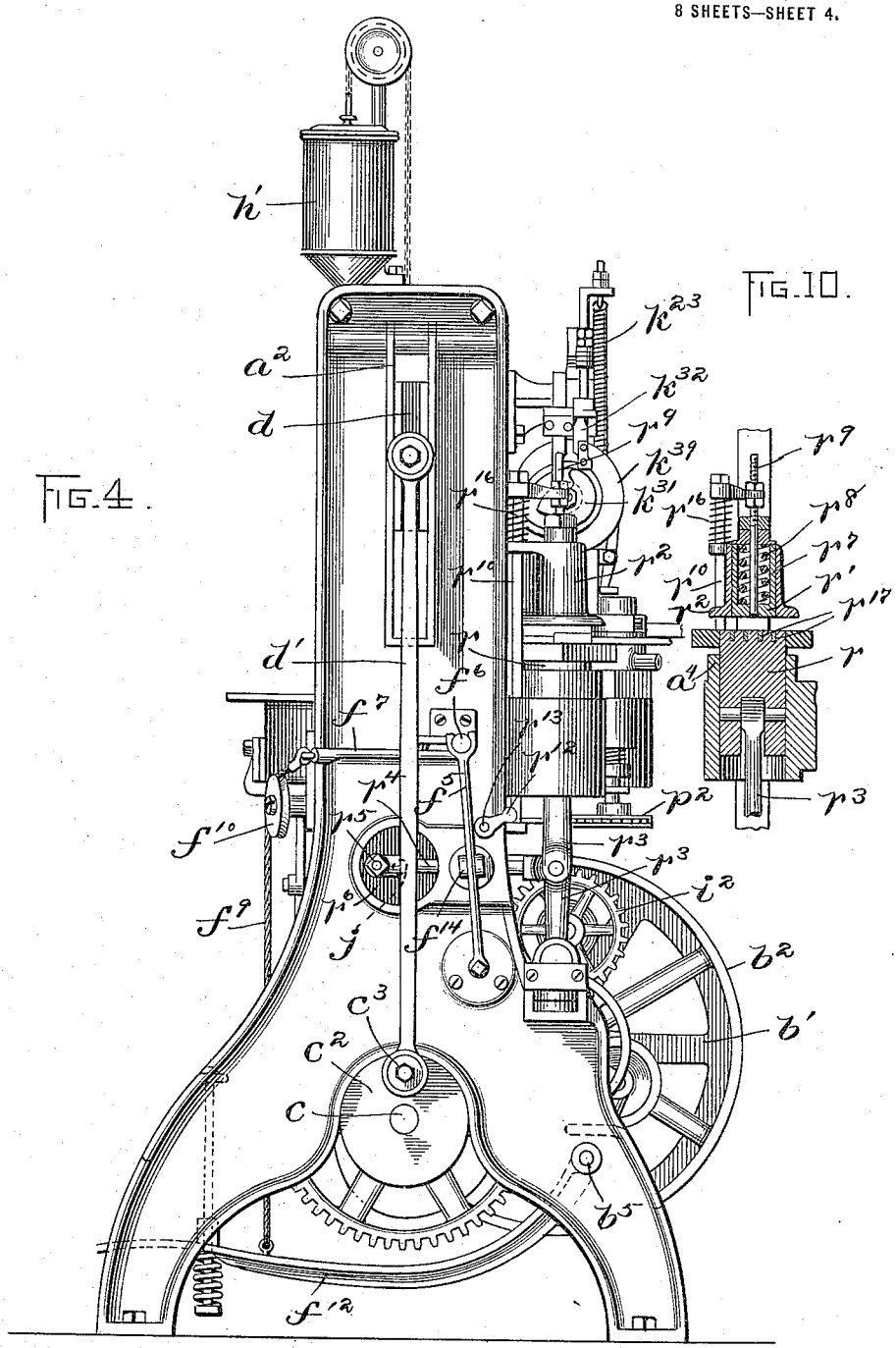

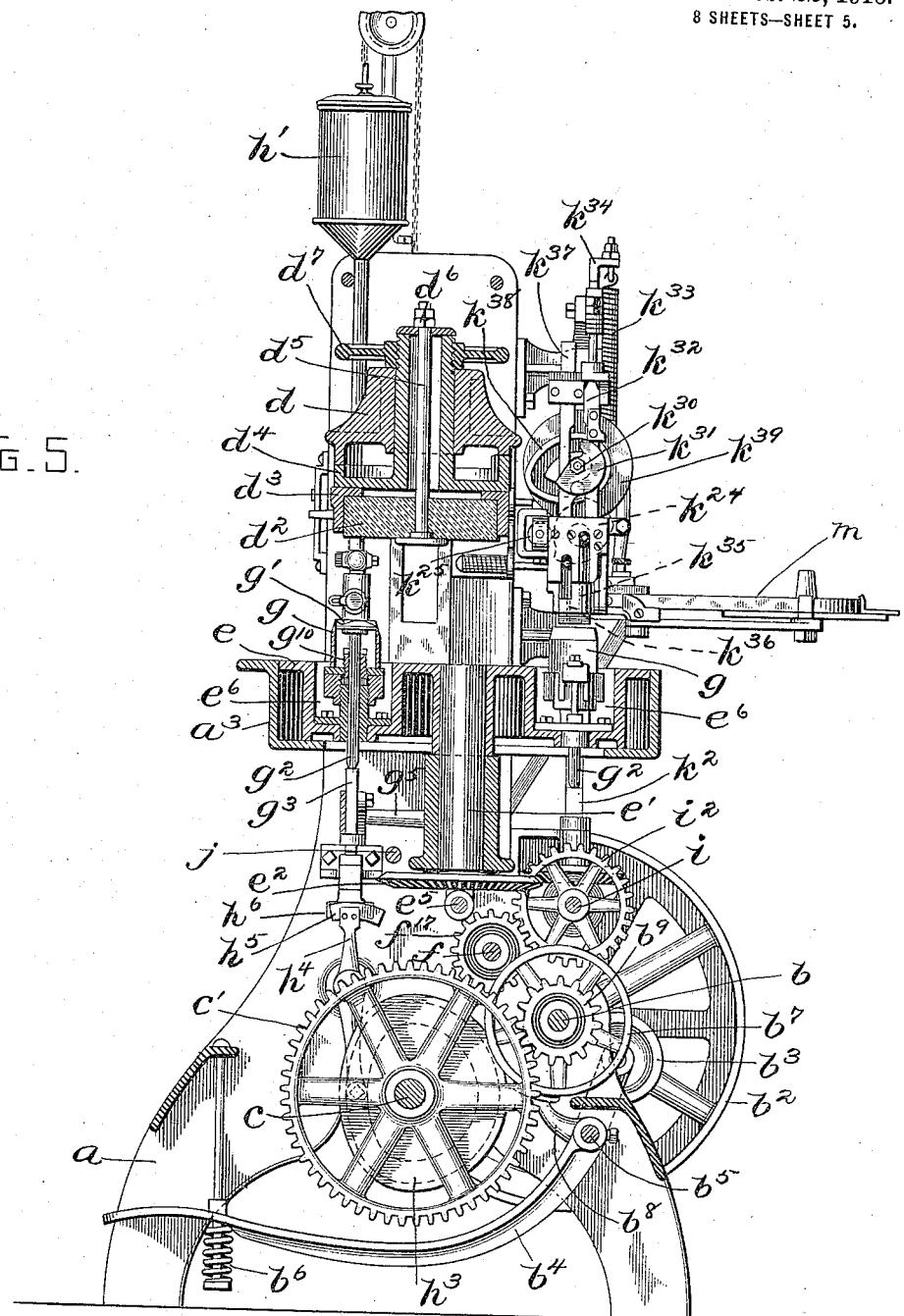

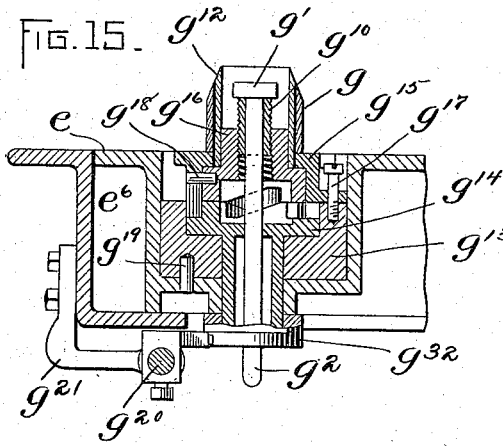
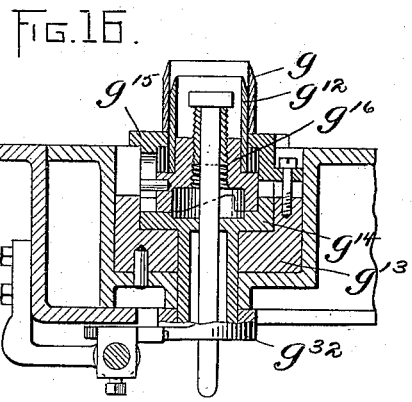
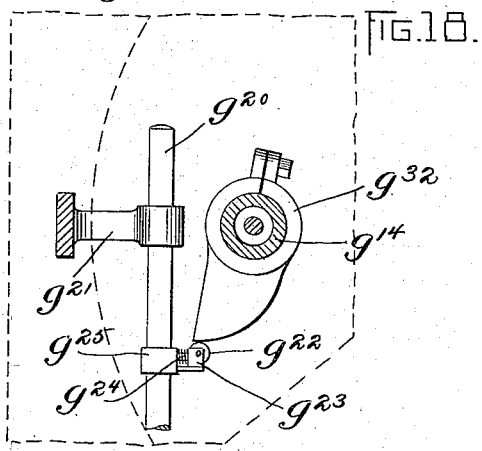
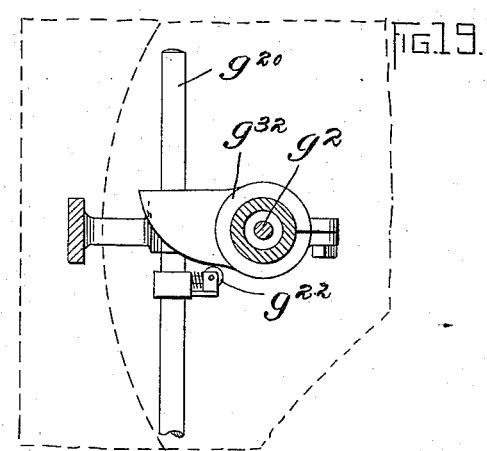
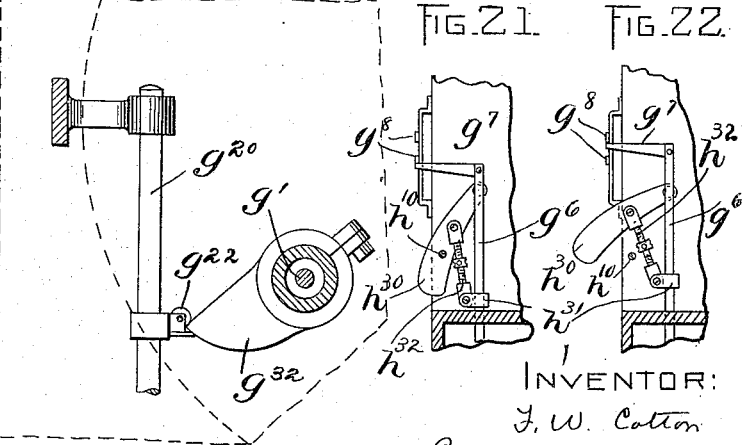

UNITED STATES PATENT OFFICE.

FREDERICK W. COTTON, OF BOSTON, MASSACHUSETTS; WATERMAN L. WILLIAMS, OF HOLDEN, MASSACHUSETTS, EXECUTOR OF SAID COTTON, DECEASED.

HEEL-MACHINE.

1,173,098. Specification of Letters Patent. Patented Feb. 22, 1916.

Application filed July 28, 1913, Serial No. 781,491. Renewed May 20, 1915. Serial No. 29,450.

*To all whom it may concern:*

Be it known that I, FREDERICK W. COTTON, a citizen of the United States, of Boston, in the county of Suffolk and State of Massachusetts, have invented certain new and useful Improvements in Heel-Machines, of which the following is a specification.

This invention has for its object to provide improvements in heel-machines of the character described in United States Letters Patent to E. H. Parks and to F. W. Coy, numbered and dated, respectively, 297,437, April 22, 1884, and 329,022, October 27, 1885. The machine makes heel-blanks, and briefly stated, its operations are: first, cutting the lifts by means of a die and reciprocating die-block, and pasting the heel-lifts as they are cut; then rotating the table which carries the die, filled with heel-lifts; driving pegs through the lifts by means of a mechanism at the back of the machine, in order to hold the heel-blank together; then ejecting the blank from the die, and conveying it to a suitable press for compacting the heel; and finally pressing the heel, and ejecting it from the machine.

The machine consists in the several novel features of construction and arrangement which I shall now proceed to describe and claim.

Of the accompanying drawings, forming a part of this specification,—Figure 1 represents a front elevation of a heel-machine constructed in accordance with my invention. Fig. 2 represents a rear elevation thereof. Fig. 3 represents a left-end elevation. Fig. 4 represents a right-end elevation. Fig. 5 represents a median vertical section. Fig. 6 represents a section on line 6—6 of Fig. 2. Fig. 7 represents a detail elevation, with parts in section, of a portion of the pegging mechanism. Fig. 8 represents a section on line 8—8 of Fig. 2. Fig. 9 represents a detail elevation of the strip-feeding mechanism. Fig. 10 represents a vertical section through the press. Fig. 11 represents a horizontal section of the machine, taken above the rotary table. Fig. 12 represents a section on the line 12—12 of Fig. 11. Fig. 13 represents a detail of parts shown in Fig. 11, illustrating a different position of said parts. Fig. 14 represents a detail section of the paste-arm. Fig. 15 represents a vertical section of a double die employed. Fig. 16 represents a similar view, showing the parts in another position. Fig. 17 represents a horizontal section, showing the operating mechanism of the die in one position. Figs. 18 and 19 represent similar views, showing the parts in successive positions. Fig. 20 represents a detail plan of the mechanism for rotating the die-block. Figs. 21 and 22 represent detail views of a mechanism for controlling the operation of the paster.

The same reference characters indicate the same parts in all of the figures.

Referring to the drawings,—$a$ designates the frame of the machine, and $b$ the main shaft, carrying at its end a clutch of which the member $b'$ is fixed on the shaft, and the member $b^2$ is formed as a belt-wheel and is movable longitudinally on the shaft. The clutch is thrown off by suitable springs, and is thrown on by means of a beveled wheel $b^3$ carried by an arm which is mounted on a shaft $b^5$, said bevel-wheel engaging a correspondingly beveled hub on the clutch member $b^2$. The shaft $b^5$ has a treadle $b^4$ affixed to it, which treadle is provided with a retracting-spring $b^6$. On said shaft is also fixed a brake-shoe $b^8$ operating on a friction-wheel $b^7$ on the shaft $b$, to arrest the motion thereof when the clutch is thrown off. A pinion $b^9$ fixed on the shaft $b$ engages a gear-wheel $c'$ fixed on a second shaft $c$. The latter has at its ends the plates $c^2$, $c^2$, carrying the wrist-pins $c^3$, $c^3$, to which are connected the lower ends of the side connecting-rods $d'$, $d'$ which operate the reciprocating cross-head $d$. The said cross-head carries the wooden die-block $d^2$, which is supported in a shell or case $d^3$ secured by a spindle $d^5$ to the under flat face of a cam member $d^4$. The latter is clamped to the cross-head by means of a screw-threaded hand-wheel or nut $d^7$, which engages a screw-threaded sleeve on said member $d^4$. The cross-head and cam member are formed with inclines, so that on rotating the cam member and securing it by means of the hand-wheel $d^7$, the vertical height of the die-block may be changed with relation to the cross-head, so as to allow for wear.

As a means for rotating the die-block and preventing the die from always striking in the same place thereon, I show a friction-roll $d^8$ attached to a shaft $d^9$ which is journaled in the cross-head. The said shaft carries at its upper end a ratchet-wheel $d^{10}$, and the cross-head carries a pivotal bell-crank lever $d^{13}$ engaged at one end with the cam-slot in a plate $d^{14}$ secured to the machine-frame. The bell-crank lever has at its other end a spring-projected pawl or detent $d^{12}$, which engages the ratchet-wheel $d^{10}$. As the cross-head reciprocates, the cam-slot oscillates the bell-crank lever and causes the rotation of the ratchet and friction-roll, thereby turning the block $d^2$ step-by-step on its shaft. The casing $d^3$ of said block is held loosely against the bottom of the cam member $d^4$ by properly adjusting the lock-nuts $d^6$ at the upper end of its attaching spindle $d^5$.

$e$ is the rotary table, carrying the dies $g, g$, and mounted to rotate inside of a socket or depression in a platform $a^3$ forming a portion of the machine-frame. The shaft $e'$ of said rotary table $e$ is suitably journaled in the frame, and carries at its lower end a bevel-gear $e^2$ which meshes with a pinion $e^4$ on a shaft $e^5$. The latter carries also a spur-pinion $e^3$ meshing with a pinion $f'$ loosely mounted on a shaft $f$ and having secured on its hub one member $f^2$ of a claw-clutch. The other member $f^3$ of said clutch is held from rotation on the shaft $f$, and is longitudinally movable thereon to engage the member $f^2$. The shaft $f$ is provided with a gear $f^{15}$ (Fig. 3) engaging a pinion $f^{16}$ on the hub of the belt-wheel $b^2$, the shaft $f$ being thereby constantly driven. A spring $f^4$ normally holds the clutch members $f^2, f^3$ out of engagement, and means are provided for throwing them into engagement, comprising a lever $f^5$ pivoted on a fixed bracket or stud $f^{14}$, a sliding pin or bolt $f^6$ engaged with the upper end of the lever, a second lever $f^7$ (Fig. 11) pivoted at $f^8$ to the machine-frame and engaged with the sliding bolt $f^6$, and a treadle $f^{12}$ provided with a retracting-spring $f^{13}$ and connected with the lever $f^7$ by means of a cord or chain $f^9$ passing over a guide-pulley $f^{10}$. The inner end of the bolt $f^6$ projects inside the frame, and its inner end is adapted to engage with a notch $a^5$ on the periphery of the table $e$. To rotate the table, the operator depresses the treadle $f^{12}$, throwing the members of the clutch into engagement, and then releases the treadle. The bolt $f^6$ is drawn out of the notch $a^5$, and by impinging against the periphery of the table, holds the clutch members in engagement until a similar notch on the other side of the table is reached, into which the bolt is projected by means of the spring $f^4$, and the clutch members are released.

As the lifts are cut out from the sheet of leather held in the hands of the operator, by the coaction of the die-block and the die, they are automatically pasted by means of an oscillatory paste-arm $h$, (Figs. 1 and 11) which receives paste from a pot $h'$ through a pipe $h^2$. The paste may descend by gravity, or be forced down by means of a suitable agitator, through the pipe $h^2$, and out to the end of the hollow paste-arm. The arm is mounted at the top of a vertical shaft $h^{20}$, which carries at its lower end a bevel-gear segment $h^6$. The latter meshes with a similar segment $h^5$ on the upper end of a pivotal lever $h^4$ (Fig. 5) whose lower end carries a cam-roll occupying the groove in a path-cam $h^3$ which is mounted on the shaft $c$. As soon, therefore, as said shaft is set in motion by the operation of the clutch at its end, the paste-arm is oscillated between the positions indicated by dotted and full lines in Fig. 11. On the up stroke of the cross-head $d$, the paste-arm comes out over the die $g$, and deposits a drop of paste on the top lift in the die. Its outward stroke operates a valve $h^7$, consisting of a sleeve having an aperture $h^8$ on its lower side, adapted to register with a similar aperture $h^9$ in the paste-arm, said sleeve being normally forced to close by means of a spring $h^{12}$. A rod $h^{10}$ connected with the valve abuts against a movable plate $h^{30}$ as the arm reaches its operative position, and thereby said valve is opened.

For the purpose of easily determining the proper thickness for each heel-blank, I show an indicator which comprises the following mechanism: $g'$ is a plunger or ejector mounted inside the die $g$ and having a stem $g^2$ (Fig. 5) which projects through the bottom of the die and extends below the table. Said stem when the die is in position below the cutting block, rests on the top of a rod $g^3$ carried at the end of a bar or lever $g^4$ which is pivoted on a stud $g^5$. The other end of said lever is pivoted to a vertical index-rod $g^6$ at one side of the machine, carrying an index finger $g^7$ at its upper end. In proximity to the index-finger is an index-plate on the machine-frame, having markers $g^8, g^8$ which are adjustable up and down in a slot $g^9$. These markers may be moved a greater or less distance apart to indicate the desired thickness of heel to be formed, and as the lifts accumulate in the die, the index-finger $g^7$ moves up and informs the operator of the thickness of the heel-blank.

Having accumulated enough lifts to form a heel, the operator releases the treadle $b^4$ which controls the reciprocating die-block, and steps on the treadle $f^{12}$ in order to rotate the table and carry around the full die to the rear of the machine, bringing the other die with which the machine is provided, into position to form a new heel. The heel which has just been cut is then automatically pegged by the pegging devices at the back of the machine. The said devices are organized as follows: $k$ is a swinging bracket carrying the pegging mechanism and journaled in bearings $k', k'$ on the machine-frame. Through the lower bearing passes a vertical shaft $k^2$, carrying at its upper end a bevel-gear $k^3$, which meshes with a second bevel-gear $k^4$ loosely mounted on the main shaft $k^6$ of the pegger. Said shaft $k^2$ carries at its lower end a bevel-gear $k^7$, meshing with a bevel-pinion $i'$ on a shaft $i$, which carries a spur-gear $i^2$ meshing with a spur-pinion $f^{17}$ fixed to the shaft $f$ (see Figs. 2 and 5). The shaft $k^2$ is therefore constantly driven. The hub of the bevel-gear $k^4$ is formed as the half of a claw-clutch. The other half $k^8$ of said clutch is splined to the shaft $k^6$, and is normally projected into engagement with the bevel-gear hub by means of springs $k^9$, $k^9$ abutting against a plate $k^{10}$ which rotates with the shaft. The sleeve or clutch member $k^8$ is provided with a peripheral lug or boss $k^{12}$ (Figs. 2 and 3) adapted to be engaged by the inclined face of a lever $k^{13}$ pivoted at $k^{14}$ to the bracket $k$. A rod $k^{15}$ connects the heel of said lever with one end of a short lever $k^{16}$ pivoted on a stud $k^{19}$ and carrying a spring-retracted pawl $k^{17}$. The latter is adapted to be engaged by a beveled cam $k^{18}$ secured to the end of the shaft $j$. When the table is rotated through a half-revolution, this cam $k^{18}$ displaces the pawl $k^{17}$ and moves the upper end of the lever $k^{13}$ out of engagement with the lug $k^{12}$ on the clutch member $k^8$. This starts the pegging mechanism in motion. During the revolution of the shaft $k^6$ and the clutch member $k^8$, the arm or lever $k^{13}$ is held a slight distance away from the periphery of said clutch member, so as not to interfere therewith, by means of a mechanism including a lever $k^{20}$ pivoted at $k^{21}$ to the machine-frame and carrying the short lever $k^{16}$, a link $k^{22}$ pivoted to the upper end of said lever $k^{20}$, and a wrist-pin $k^{23}$ on the plate $k^{10}$ pivotally connected with the end of said link.

On the shaft $k^6$ is secured a spur-gear $k^{28}$ and a cam $k^{24}$. The latter coöperates with a roll $k^{25}$ mounted in a swiveled bearing on the machine-frame, in moving the bracket $k$ outwardly to secure the proper action of the pegging devices. Said bracket is returned by means of a spring $k^{26}$ acting on a rod $k^{27}$ attached to the bracket $k$. The gear $k^{28}$ meshes with a pinion $k^{29}$ secured on a shaft $k^{30}$. At the forward end of the latter is a cam $k^{31}$, which operates the awl-bar $k^{32}$ carrying at its lower end the awl $k^{35}$ (Fig. 5). Said cam $k^{31}$ operates to raise the awl-bar, the latter being depressed to force the awl into the heel by means of a spring $k^{33}$ attached to a pivotal arm $k^{34}$ which acts on the upper end of the awl-bar.

$k^{37}$ is the driver-bar, operated by means of a path-cam $k^{38}$ formed on a cam-plate $k^{39}$ and engaging a roll on said driver-bar. At the lower end of the latter is the driver $k^{36}$. The driver-bar and awl-bar operate through guide-holes $k^{60}$, $k^{61}$ in a templet $k^{40}$ (Fig. 6). The pegs which are driven by the driver into the holes in the heel formed by the awl are cut from the end of a peg-strip $m$ by means of a knife $k^{41}$ carried on a reciprocating slide $k^{42}$. Said slide has a slot at one end, occupied by a pin $k^{45}$ on one end of a bell-crank lever $k^{43}$ which is pivoted at $k^{44}$ to the bracket $k$. A cam-lug or boss $k^{46}$ secured to the cam-plate $k^{39}$ acts on the end of this bell-crank lever to reciprocate the knife and cut the pegs from the strip $m$. The bell-crank lever and slide are retracted by means of a spring-plunger $k^{47}$ (Fig. 7).

The feed devices for feeding the strip $m$ consist of a roll $k^{48}$ opposed by a spring $k^{57}$ and having a knurled or spurred surface, which engages the strip; a ratchet-wheel $k^{49}$ mounted on the roll-shaft and engaged by a spring-pawl $k^{50}$ carried at the lower end of a lever $k^{51}$ pivoted at $k^{52}$ to the frame $k$; and a cam-lip $k^{55}$ on the edge of the cam member $k^{39}$, said lip engaging a roll $k^{54}$ on the upper end of the lever $k^{51}$. As the cam member $k^{39}$ revolves, the roll $k^{40}$ is rotated to advance the strip $m$ a distance equal to the width of a peg after each stroke of the knife $k^{41}$. The upper shaft $k^{30}$ of the pegging mechanism makes twice as many revolutions as the lower shaft $k^6$, the purpose of this being to peg two holes in the heel-blank while the shaft $k^6$ is revolving once. The cam $k^{24}$ acts upon the roll $k^{25}$ so as to move the pegging mechanism outwardly immediately after the awl has driven the first hole, to allow the driver to insert a peg in said hole. The awl then drives another hole, and the cam moves the mechanism out a farther distance, and allows the driver to drive the second peg, after which the mechanism is returned to its initial position.

As a novel means for supporting the peg-strip $m$, I have provided the arm $m^3$, loosely pivoted on a stud $m^4$ on the bracket $k$, said arm carrying at its outer end a reel $m'$ pivoted on a stud $m^2$ and having its arms formed with upwardly projecting lugs $m^5$, $m^5$, which confine the coiled peg-strip. When the machine is started, a length of strip is uncoiled, and the arm $m^3$ moved over to the right (Fig. 6), and as said strip is split up into pegs and fed into the pegging mechanism, the arm $m^3$ and the reel $m'$ are drawn over to the left, toward the pegging mechanism. Another length is then uncoiled, for the further operation of the machine.

During the pegging operation, the plunger $g'$ inside the die rests on top of an adjustable sleeve $g^{10}$, whose distance from the top of the die is regulated to correspond with the thickness of the heel-blank which is being manufactured. After the pegging operation is finished, the operator rotates the table and brings the die which has been at the rear of the machine, and which holds the pegged heel, around to the front of the machine, to receive a fresh heel. As the table starts to revolve, the stem $g^2$ of the plunger in the rear die impinges against the beveled face of a cam-plate $o$ (Fig. 2) which elevates the plunger and causes the pegged heel to be ejected from the die. As the heel becomes freed from the die, it is engaged by the conveyer which I shall now describe, and carried onto the press, which acts in a manner hereinafter described.

At one side of the table $e$, is mounted in suitable bearings the conveyer-shaft $p$, and on said shaft is rigidly secured the conveyer-arm $p'$ having a head or jaw at its outer end to engage the heels. Loosely mounted below said conveyer-arm, on the same shaft, is a spider $p^{10}$, at the ends of whose arms are mounted jaws or heads $p^9$ similar to the conveyer-jaw but turned in the opposite direction. The hub of said spider $p^{10}$ is pressed against by friction-springs $p^{12}$, $p^{12}$, (Fig. 12), so as to frictionally restrain the spider from rotation, but allow the same to rotate when sufficient force is supplied. The conveyer-arm $p'$ is actuated by mechanism including a sprocket-wheel $p^2$, at the lower end of its shaft $p$; a sprocket-chain $p^3$ engaging said wheel and attached at its ends respectively to an actuating-arm $p^4$ pivoted at $p^5$ to the machine-frame, and a retracting-spring $p^8$; a cam-roll $p^6$ mounted on said arm $p^4$; and a cam $p^7$ engaging said roll and mounted on a shaft $j$ which revolves when the table is turned. Said shaft carries a gear $j'$ (Fig. 1) engaging a gear-pinion $e^7$ (Figs. 1 and 2) mounted on the shaft $e^5$.

In Fig. 11 the normal position of the conveyer parts is shown. As the table revolves, the heel is ejected from the die $g$, just as said die comes underneath the open space between the conveyer-arm $p'$ and the first of the arms on the spider $p^{10}$. At this instant, the cam $p^7$ acts on the cam-roll $p^6$, and rotates the shaft $p$, advancing the conveyer-jaw rapidly toward the heel, and causing said heel $z$ to be engaged between the conveyer-jaw and the jaw $p^9$ on the spider, as shown in Fig. 13, whereby the heel is removed from the die and carried on to the press-plunger, $r$. A plate $r'$ mounted on the frame in front of said press-plunger prevents the heel from falling if the grip of the conveyer members should be insecure. As soon as the conveyer-arm $p^2$ has advanced the heel to the center of the press-plunger, said arm is returned by means of its actuating mechanism, to its initial position, as shown in Fig. 11. The jaws on the ends of the spider-arms and on the conveyer-arm are normally in the same plane, so that on the return stroke of the said conveyer-arm, it is necessary to allow the latter to pass the next spider-arm in the rear. This is accomplished by means of a collar $p^{13}$, secured to the shaft $p$ and having a lug or boss $p^{14}$ which coöperates with a cam $p^{15}$ on the machine-frame. As the conveyer-arm sweeps forward to engage the heel-blank, the stud $p^{14}$ impinges against the cam $p^{15}$ and raises the conveyer-arm slightly; and on the return stroke, this motion is reversed, allowing the conveyer-jaw to pass over the jaw $p^9$. A spring $p^{16}$ maintains the cam members $p^{14}$, $p^{15}$ in contact.

As soon as the heel-blank reaches the press-plunger $r$, the latter is raised by its operating mechanism, and coöperates with a bed-block $r^2$ in compressing and compacting the heel. Said operating mechanism includes the toggle-arms $r^3$, $r^3$, and the rod $r^4$ connected with the knuckle of the toggle and with a wrist-pin $r^5$ on a plate $r^6$ which is mounted on the end of the shaft $j$ (see Fig. 4).

After the heel is compressed and the plunger $r$ descends, a clearer $r^9$ consisting of a rod which passes through the center of the bed-block acts to force the heel away from said block, the heel usually having a tendency to stick thereto. The rod $r^9$ is supported by a yoke carried at the upper end of a vertical rod $r^{10}$ which is depressed by means of a spring $r^{16}$ and raised by a mechanism including the short arm $r^{12}$ (Fig. 4) mounted on the shaft $r^{13}$ and carrying inside of the frame-plate an arm $r^{14}$ (Fig. 12) which is acted on by a cam $r^{15}$ on the shaft $j$. As a further means for clearing the heel from the press, I provide a grating $r^{17}$ which, when the plunger $r$ is raised, rests in channels or grooves in the plunger-face, normally flush with the top of said plunger. When the latter is depressed, this grating rests on the upper edge $a^4$ of the plunger-socket, and the plunger further descending separates itself from the heel and leaves the latter supported only by the cross-bars of the grating $r^{17}$. When a new heel is placed by the conveyer in the press, the back of the advancing spider jaw $p^9$ sweeps the pressed heel off the top of the plunger, into a convenient receptacle placed at the side of the heel machine. The bed-block is made with a yielding section comprising a plunger $r'$ resisted by a stiff spring $r^8$ supported by the outer shell of the bed-block.

In Fig. 5 I have represented single dies $g$ occupying the pockets $e^6$ provided for their reception in the table $e$. When "deck-heels" are being manufactured, it is desirable to employ a double die of the character illustrated in Figs. 15 and 16. The latter comprises two die members $g$ and $g^{12}$, one inside the other, and provided with means whereby one is raised and the other lowered at the proper time, to change the size of the lifts cut. The outer die $g$ is mounted on a base $g^{15}$, and the inner die is mounted on an independent base $g^{16}$. Below these is a rotary cam member $g^{14}$ having its upper edge provided with oppositely directed inclines, which act on corresponding inclines formed on the die bases, so as to raise one die and at the same time lower the other. The parts are supported on a bed-block $g^{13}$ which is held from rotating with respect to the table $e$ by means of a steady-pin $g^{19}$, and steady-pins $g^{17}$ and $g^{18}$ are further provided, to prevent the relative rotation of the two die members and the bed-block $g^{13}$. At the lower end of the sleeve forming part of the member $g^{14}$, and projecting below the die, is secured an arm $g^{32}$. In proximity thereto, in brackets $g^{21}$ on the machine-frame, is mounted a slide-rod $g^{20}$ (Figs. 17 to 19 and Fig. 1), said rod having a pin $g^{26}$ (Fig. 1) which engages a slot in the end of a bell-crank lever $g^{27}$ mounted on a stud $g^{28}$, said lever being connected at its other end with a vertical rod $g^{29}$ which is operated by a treadle $g^{30}$ having a returning spring $g^{31}$. On the rod $g^{20}$ is affixed a collar $g^{25}$, which carries a roller-stud $g^{22}$. The latter is mounted in a bearing block $g^{23}$, which is normally projected outwardly by a spring $g^{24}$. In forming a heel with the double die, a number of lifts are first cut with the inner die $g^{12}$, and the latter is then retracted and the outer die $g$ is raised to operative position to cut the remaining lifts. The table is then rotated with the die members in this position, and the heel is then pegged by the described mechanism, and ejected from the die. The latter comes back toward its first position, in front of the machine, with the members in the relation shown in Fig. 16. Before the table is stopped, however, with the die in front, the end of the arm $g^{32}$ engages the roll $g^{22}$ on the slide-rod $g^{20}$, as shown in Fig. 17, and the further rotation of the table causes the said arm $g^{32}$ to assume a position substantially parallel to the rod $g^{20}$, as shown in Fig. 18. This rotates the cam $g^{14}$ and brings the two dies $g$, $g^{12}$ into their proper initial position illustrated in Fig. 15. Then when the operator desires to raise the outer die $g$, he depresses the treadle $g^{30}$, causing the rod $g^{20}$ to slide in its guides, and producing the action shown in Fig. 19, the roll $g^{22}$ moving along the curved edge of the arm $g^{32}$ and turning the same at right angles to its position in Fig. 18, thereby rotating the cam $g^{14}$ in the desired manner to bring the dies $g$, $g^{12}$ into the relation shown in Fig. 16.

Figs. 21 and 22 represent in detail a mechanism for controlling the action of the paster-operating rod $h^{10}$ so that when lifts have accumulated to the desired thickness in the die $g$, the paster will be thrown out of action, thereby avoiding a deposit of paste on the uppermost lift. $h^{30}$ is a pivoted plate normally occupying a position in which the end of the arm $h^{10}$ may abut against it as the paster arm $h$ swings over the die whereby the sleeve $h^{7}$ is pushed forward to cause the deposit of a drop of paste. Attached to the index-rod $g^{6}$ is a collar $h^{31}$ connected by a link $h^{32}$ of adjustable length with the plate $h^{30}$ in such manner that as the index-rod rises the plate $h^{30}$ will be thrown outwardly and will finally move out of the path of the rod $h^{10}$, as shown in Fig. 22. Such movement of the plate out of the path of the rod is timed to occur when the last lift forming the heel-blank is cut, so that on the next movement of the paster over the die, no deposit of paste will occur.

In Fig. 6 is shown an improvement in connection with the peg-cutting mechanism, whereby a single peg only at a time is cut from the peg-strip and driven into the heel-blank. In this figure it will be noted that the knife $k^{41}$ is so related to the templet hole $k^{60}$ as to cut only a single peg, which peg after being cut, is advanced into the driver hole $k^{60}$ in the templet by a feed movement of the strip $m$, and is then driven into the heel. Prior machines of this character have cut farther back on the strip so that several cut pegs were present at the same time, the forward one of these pegs being driven into the heel at each stroke of the driver. This arrangement often resulted in fouling of the pegs, and is obviated by my present improvement.

I claim:—

1. A machine of the character specified comprising in one organized machine, means for cutting heel lifts, means for pasting each lift after it is cut, means for assembling a predetermined number of the lifts, and means for throwing the pasting mechanism out of operation in connection with the top lift of the series.

2. A machine for automatically making heels from a sheet of leather, comprising means for cutting lifts from the sheet, means for pasting and assembling a predetermined number of the lifts, means for throwing the pasting mechanism out of operation upon the uppermost lift of the series, means for pegging the assembled lifts, and means for pressing the assembled series.

3. In a machine of the character specified, the combination with the rotary table and the die carried thereby and provided with an ejector, of an oscillatory conveyer-arm or sweep, means for actuating the same, and a frictionally restrained member adapted to coöperate with said arm in gripping the heel-blank and conveying it from the die to one side of the table.

4. In a machine of the character specified, the conveyer device comprising an oscillatory arm having a gripping jaw or head, means for actuating said arm, and a friction-journaled rotary spider having gripping jaws or heads on its arms, adapted to coöperate with the arm-jaw in gripping and transporting the heel-blank.

5. In a machine of the character specified, the conveyer device comprising a friction-journaled rotary spider having gripping jaws or heads on its arms, an oscillatory arm having a jaw or head normally in the same plane with said jaws or heads, and means for displacing said oscillatory arm on its reverse stroke to allow the jaw thereon to pass a spider-jaw.

6. In a machine of the character specified, the combination of a die for cutting and holding a series of lifts, a swinging paster-arm having a paster and a paster-operating member, a device coacting with said paster-operating member to cause a deposit of paste on the uppermost lift in the die when the paster swings over the die, and means actuated by the accumulation of lifts in the die for throwing said device out of action.

In testimony whereof I have affixed my signature, in presence of two witnesses.

FREDERICK W. COTTON.

Witnesses:
A. W. HARRISON,
D. L. CLARK.

Copies of this patent may be obtained for five cents each, by addressing the "Commissioner of Patents, Washington, D. C."